United States Patent [19]
Marsh et al.

[11] Patent Number: 5,087,595
[45] Date of Patent: Feb. 11, 1992

[54] INJECTION MOLDING OF ZIRCONIA OXYGEN SENSOR THIMBLES BY AN AQUEOUS PROCESS

[75] Inventors: Gary B. Marsh, Pittstown; Anthony J. Fanelli; Joan V. Burlew, both of Rockaway; Clifford P. Ballard, Lebanon, all of N.J.

[73] Assignee: Allied-Signal, Inc., Morristownship, Moris County, N.J.

[21] Appl. No.: 720,548

[22] Filed: Jun. 25, 1991

Related U.S. Application Data

[63] Continuation-in-part of Ser. No. 553,505, Jul. 18, 1990, abandoned.

[51] Int. Cl.$^5$ .............................................. C04B 35/48
[52] U.S. Cl. .................................. 501/105; 264/328.2; 264/328.14
[58] Field of Search ....................... 501/103, 104, 105; 264/122, 328.2, 328.14, 328.17

[56] References Cited

U.S. PATENT DOCUMENTS

| | | | |
|---|---|---|---|
| 4,113,480 | 9/1978 | Rivers | 75/214 |
| 4,265,794 | 5/1981 | Pett et al. | 260/28.5 R |
| 4,734,237 | 3/1988 | Fanelli et al. | 264/122 |

Primary Examiner—Karl Group
Assistant Examiner—Chris Gallo
Attorney, Agent, or Firm—Ernest D. Buff; Gerhard H. Fuchs

[57] ABSTRACT

A ceramic element of a zirconia oxygen sensor is shaped from a powder mixture. The mixture, comprising a ceramic powder having an average particle size less than or equal to 1 micrometer, a gel-forming material and a gel forming material solvent, is molded at a temperature and pressure sufficient to produce the ceramic element having a density of at least 5.5 g/cm$^3$.

22 Claims, 4 Drawing Sheets

AQUEOUS INJECTION MOLDING PROCESSING STEPS

AQUEOUS INJECTION MOLDING PROCESSING STEPS

APPARENT VISCOSITY OF 2 WT % AGAR SOLUTION

Molded Thimble Drying

INJECTION MOLDING OF ZIRCONIA OXYGEN SENSOR THIMBLES BY AN AQUEOUS PROCESS

CROSS-REFERENCE TO RELATED APPLICATIONS

This application is a continuation-in-part of U.S. patent application Ser. No. 553,505, filed July 18, 1990 now abandoned.

FIELD OF THE INVENTION

This invention relates to processes for shaping ceramic parts from powders and molding compositions therefor. More particularly, the invention is directed to molding processes and molding compositions for forming a tubular ceramic substrate for oxygen sensor elements, which can be readily fired net-shape without the need for machining and shaping operations.

BACKGROUND OF THE INVENTION

The oxygen sensor used in automobiles to control the air/fuel mixtures and other industrial applications employs a zirconia ceramic element. It is desirable to fabricate the element in the most economical manner feasible, consistent with good operating performance and longevity. Isopressing is a popular method employed in the manufacture of cylindrical shapes characteristic of the oxygen sensor element. Isopressing produces a preform in the approximate shape of the element, which must be machined to the required shape before densification by sintering. The machining step represents an extra operation in the manufacturing process, adding cost to the overall process. In addition, a certain yield loss is associated with machining due to breakage of some of the pre-forms during the machining process. The yield loss due to breakage contributes to a higher manufacturing cost of the final product.

Injection molding is a net-shape forming process, and, therefore, offers considerable advantages over processes that require additional machining and finishing operations in order to produce a ceramic part.

SUMMARY OF THE INVENTION

The present invention provides aqueous composition for molding ceramic oxygen sensor elements and a net shape fabrication process that eliminates tubular shape machining. Particular advantages accruing from the process are the relatively small amount of binder used, the simplicity of and time saved during downstream processing (drying, binder burn-out and sintering), and the high sintered density achieved as the result of the particle size employed. The unique composition and shape forming ability of the invention combined with the high part density achieved (e.g. density of at least 5.5 g/cm$^3$) makes it especially suited for production of oxygen sensors used in automotive applications, metallurgical processing and flue gas monitoring. In addition, complex sensor shapes and configurations for special applications such as test assemblies, fuel cells and the like can be molded.

More specifically, in accordance with the invention, there is provided a process for shaping an oxygen sensor element from ceramic powder. Generally stated, the process comprises the steps of forming a mixture comprising (1) ceramic powder having an average particle size less than or equal to 1 micrometer, (2) agaroid gel-forming material having a gel strength, measured at a temperature between 0° C. and about 22° C. on a gel consisting essentially of about 4 wt % of the gel-forming material and water, of at least 100 g/cm$^2$, and (3) a gel-forming material solvent; supplying the mixture to a mold having the shape of the oxygen sensor element, molding the mixture under conditions of temperature and pressure sufficient to produce a self-supporting structure; and sintering the material at elevated temperature to a density of at least 5.5 g/cm$^3$, and preferably from 5.6 to 5.8 g/cm$^3$.

BRIEF DESCRIPTION OF THE DRAWINGS

The invention will be more fully understood and further advantages will become apparent when reference is made to the following detailed description of the preferred embodiment of the invention and the accompanying drawings, wherein.

DETAILED DESCRIPTION OF THE INVENTION

Figure 1:
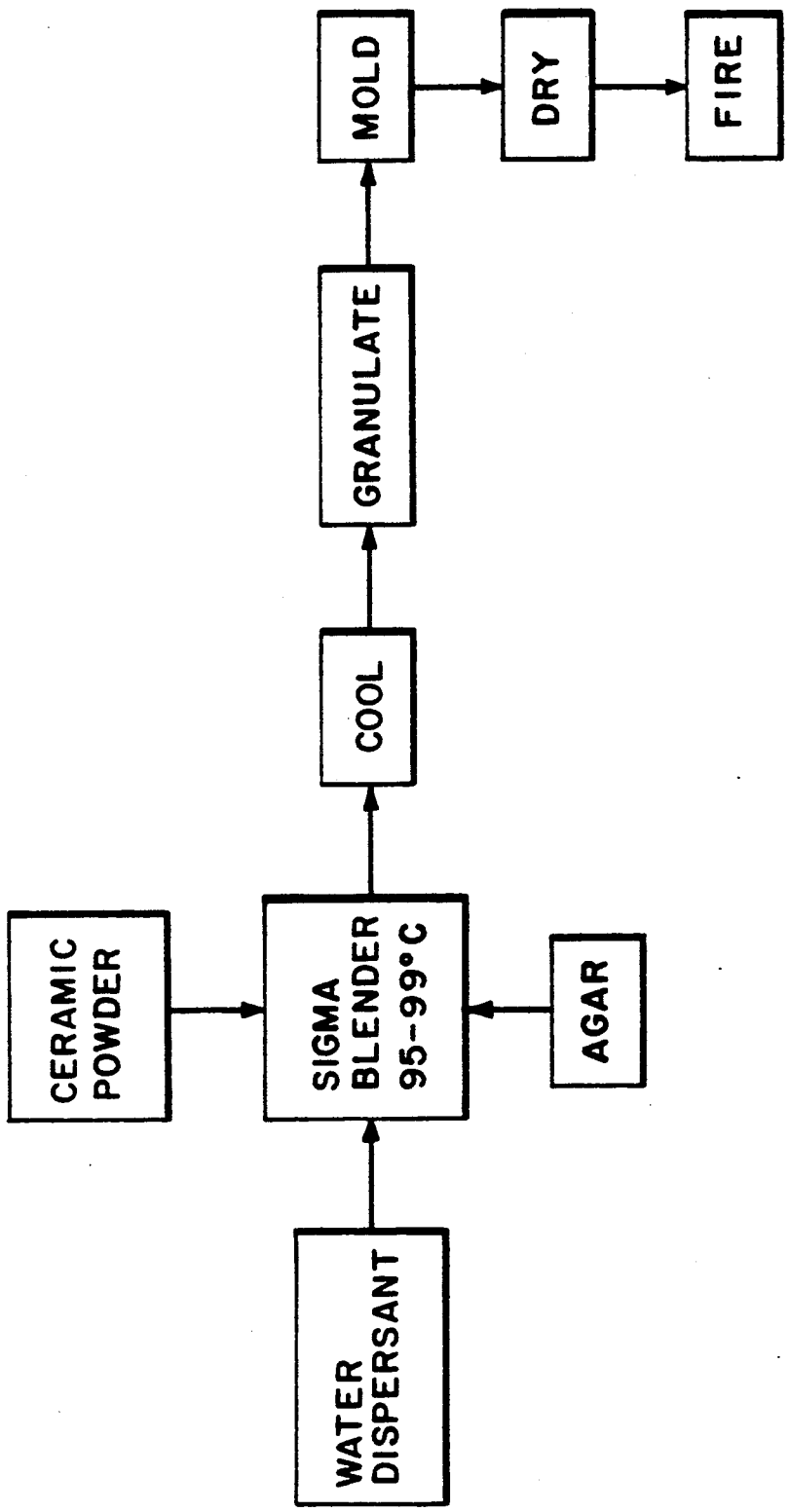
FIG. 1 is a schematic representation of the basic process steps of the present invention.

According to the process the ceramic powders are initially mixed with a gel-forming material and a solvent for the gel-forming material. In normal practice zirconia ceramics require a stabilizing additive to prevent the catastrophic destruction of the article due to the monoclinic phase transition upon cooling from the sintering temperature. Any of the stabilizers known to those skilled in the art of fabricating zirconia ceramics can be used in the process. Common stabilizers comprise oxides of the elements Y, Ce, Ca and Mg, or compounds, such as carbonates, nitrates, oxylates and the like, yielding oxides of those elements on high temperature processing (e.g. calcination). The amount of stabilizer can be chosen to produce the tetragonal, cubic or a mixture of phases comprising tetragonal, cubic and monoclinic phases. Yttria is the preferred stabilizer for the zirconia oxygen sensor. The formulation may contain other ceramic materials to produce desired effects, e.g., aluminum oxide. For the purpose of densifying the ceramic material to a density at least 5.5 g/cm$^3$, the average particle size of the powder mixture should be $\leq 1$ μm. Preferably the average particle size of the powder mixture ranges from 0.4 to 9 μm, and more preferably from 0.5 to 0.8 μm. As used herein the term "particle size" means equivalent spherical diameter, that is, the diameter of a sphere having the same volume as the particle.

This mixture is proportioned with a carrier to be fluid enough to enable it to be readily supplied to a die by any of a variety of techniques, and especially by injection molding. Generally, the amount of powder in the mixture is between about 50 percent and about 95 percent by weight of the mixture. Preferably, the powders constitute between about 75 percent and about 90 percent by weight of the mixture, and most preferably constitute between about 82 percent and about 87 percent by weight of the mixture. The preferred and most preferred amounts are quite useful in producing net and near net shape injection molded parts.

The gel-forming material employed in the mixture is a material which exhibits a gel strength, measured at a temperature between 0° C. and about 22° C. on a gel consisting essentially of about 4 wt % of the gel-forming material and water, of at least about 100 g/cm$^2$. This value of gel strength is the minimum value necessary to produce from the mixture an article having sufficient green strength to be handled at ambient temperature without the need for special handling equipment (i.e., self-supporting). As noted above, the minimum gel strength value must be achieved at least at one temperature between 0° C. and about 22° C. Preferably the value of gel strength at a temperature within the range of between 0° C. and about 22° C. is at least about 500 g/cm$^2$, and more preferably the value of gel strength is at least about 1000 g/cm$^2$. In addition, the gel-forming materials are most preferably water soluble. The higher values of gel strength can be particularly useful in producing parts with complex shapes and/or higher weights. Furthermore, higher gel strengths enable the use of smaller amounts of the gel-forming material in the mixture.

Gel strength of the gel-forming material is measured by using an apparatus commonly employed in the manufacture of industrial gums. The apparatus consists of a rod having a circular cross sectional area of 1 cm$^2$ at one end thereof which is suspended above one pan of a triple beam balance. Initially, a large empty container is placed on one pan of the triple beam balance. On the pan under the suspended rod is placed a container filled with about 200 ml (volume) of a gel consisting of about 1.5 wt % of the gel-forming material in water.

The empty container is then balanced against the gel-containing container. The rod is then lowered into contact with the top surface of the gel. Water is then metered into the empty container and the position of the balance pointer is continuously monitored. When the top surface of the gel is punctured by the rod, the balance pointer rapidly deflects across the scale and the water feed is immediately discontinued. The mass of water in the container is then measured and the gel strength, mass per unit area, is calculated.

An additional novel feature of the invention is the use of gel-forming materials which comprise an agaroid. An agaroid is defined as a gum resembling agar but not meeting all of the characteristics thereof. (See H. H. Selby et al., "Agar," *Industrial Gums*. Academic Press, New York, N.Y., 2nd ed., 1973, Chapter 3, p. 29.) As used herein, however, agaroid not only refers to any gums resembling agar, but also to agar and derivatives thereof such as agarose. An agaroid is employed because it exhibits rapid gelation within a narrow temperature range, a factor which applicants have discovered can dramatically increase the rate of production of articles. More importantly, however, we have discovered that the use of such gel-forming materials substantially reduces the amount of binder needed to form a self-supporting article. Thus, articles produced by using gel-forming materials comprising agaroids can significantly enhance the production of net shape and near net shape objects. Moreover, the production of complex articles from agaroid containing mixtures is dramatically improved as a result of the substantial reduction in the firing regimens necessary to produce a fired product.

Figure 2:
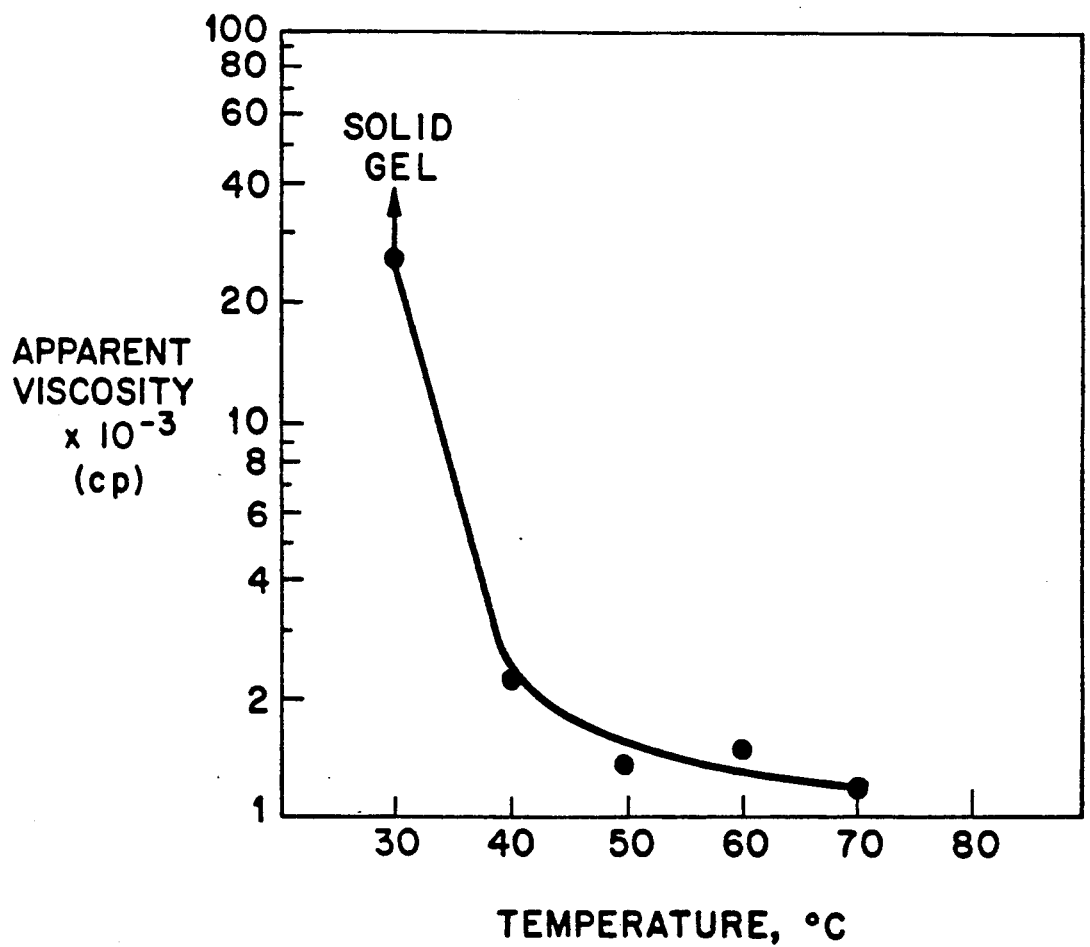
FIG. 2 is a graph depicting change in viscosity and gelling behavior of a preferred gel forming material of the invention.

The preferred gel-forming materials are those which are water soluble and comprise agar, or agarose, and the most preferred gel-forming materials consist of agar, and its purified derivative, agarose. FIG. 2 illustrates the basic features of the gel-forming material by graphically depicting the change in viscosity of a preferred gel-forming solution (2 wt % agar solution). The graph clearly illustrates the features of our gel-forming materials: low gel-forming temperature and rapid gelation over a narrow temperature range.

The gel-forming material is provided in an amount between 0.2 wt % and about 6 wt % based upon the solids in the mixture. More than about 6 wt % of the gel-forming material may be employed in the mixture. Higher amounts are not believed to have any adverse impact on the process, although such amounts may begin to reduce some of the advantages produced by our novel compositions, especially with respect to the production of net shape and near net shape bodies. Most preferably, the gel-forming material comprises between about 1 percent and about 4 percent by weight of solids in the mixture.

The mixture further comprises a gel-forming material solvent, the solvent is added in an amount sufficient to dissolve the gel-forming material. While any of the variety of solvents may be employed depending upon the composition of the gel-forming material, particularly useful solvents for agaroid-containing gel-forming materials are polyhedric liquids, particularly polar solvents such as water or alcohols, liquids such as carbonates or amides or any mixtures thereof. It is, however, most preferable to employ a solvent which can also perform the dual function of being a carrier for the mixture, thus enabling the mixture to be easily supplied to a mold. We have discovered that water is particularly suited for serving the dual purpose noted above. In addition, because of its low boiling point, water is easily removed from the self-supporting body prior to and/or during firing.

A liquid carrier is normally added to the mixture to produce a homogeneous mixture of the viscosity necessary to make the mixture amenable to being molded by the desired molding process. Ordinarily, the liquid carrier is added in an amount greater than is necessary to produce a homogeneous mixture and an amount greater than is required to insure the proper fluidity of the mixture. Generally, the amount of a liquid carrier is an amount between about 10 percent to about 40 percent by weight of the mixture depending upon the desired viscosity thereof less the amount of solvent employed to dissolve the gel-forming material. In the case of water, which performs the dual function of being a solvent and a carrier for agaroid-containing mixtures, the amount is simply between about 5 percent and about 50 percent by weight of the mixture, with amounts between about 10 percent and about 25 percent by weight being preferred.

The mixture may also contain a variety of additives which can serve any number of useful purposes. For example, dispersants (e.g., Darvan C) may be employed to ensure a more homogeneous mixture. Lubricants such as glycerine may be added to assist in feeding the mixture along the bore of an extruder barrel and additives such as glycerine to reduce the vapor pressure of the liquid carrier and enhance the production of the near net shape objects. The amount of additives will vary depending on the additive and its function within the system. However, the additives must be controlled to ensure that the gel strength of the gel-forming material is not substantially destroyed. For example, dispersing agents such as Darvan C are ordinarily added in an amount of about 1 percent by weight of the solids in the mixture, whereas glycerine may be added in amounts ranging from about 1 percent to about 10 percent by weight or higher of the mixture without adversely affecting the gel strength of the gel-forming material while maintaining the required performance levels of the additives. Table 1 below lists some typical dispersants and their effect upon the gel strength of the gel-forming material (4 wt % agar, measured at room temperature). Table 2 describes additives such as lubricants and vapor pressure reducers in amounts which do not adversely affect gel strength.

TABLE 1

| Dispersant | (4 wt % Agar) | Gel Strength, g/cm² |
| --- | --- | --- |
| Tamol SN | 3 Wt % | 1832 |
| Daxad #27 | 3 Wt % | 1703 |
| Nopcosant L | 2 Wt % | 1605 |
| Solsperse | 3 Wt % | 399 |
| Gum Arabic | 4 Wt % | No Gel |
| Emphos | 3 Wt % | No Gel |
| Dispersant | | 1900 |

TABLE 2

| Effect of Additives (4 Wt % Additive - 4 Wt % Agar) | |
| --- | --- |
| Additive | Gel Strength, g/cm² (Nominal) |
| Additive | 1900 |
| Glycerine | 1900 |
| Ethylene Glycol | 1900 |
| s-Butanol | 1900 |
| Polyacrylonitrile | 1850 |
| Polyethylene | 1550 |

The mixture is maintained at a temperature above the gel point (temperature) of the gel-forming material prior to being supplied to the mold. Ordinarily, the gel point of the gel-forming material is between about 10° C. and about 60° C., and most preferably is between about 30° C. and about 45° C. Thus, while the mixture must be maintained at a temperature above the gel point of the gel-forming material, the gel-forming materials of the present invention substantially reduce the amount of cooling of the mold normally required with the prior art processes. Usually, the temperature of the mixture is maintained at less than 100° C., and preferably is maintained at about 90° C.

The mixture is supplied to the mold by any of a variety of well know techniques including gravity feed systems, and pneumatic or mechanical injection systems. Injection molding is the most preferred technique because of the fluidity and low processing temperatures of the mixtures. The latter feature, low processing temperatures, is especially attractive in reducing the thermal cycling (thus increasing mold life) to which molds of the injection equipment are subjected.

A very wide range of molding pressures may be employed. Generally, the molding pressure is between about 20 psi and about 3,500 psi, depending upon the molding technique used. Most preferably, the molding pressure is in the range of about 40 psi to about 1500 psi. An advantage of the present invention is the ability to mold the novel compositions using low pressures.

The mold temperature must, of course, be at or below the gel point of the gel-forming material in order to produce a self-supporting body. The appropriate mold temperature can be achieved before, during or after the mixture is supplied to the mold. Ordinarily, the mold temperature is maintained at less than about 40° C., and preferably is between about 15° C. and about 25° C. Thus, for example, it is expected that optimum production rates would be achieved with an injection molding process wherein the preferred gel-forming materials (which exhibit gel points between 30° C. and about 45° C.) are employed to form a mixture maintained at about 90° C. or less, and wherein the mixture is injected into a mold maintained at about 25° C. or less. FIG. 1 schematically illustrates one embodiment of such a process.

Figure 3:
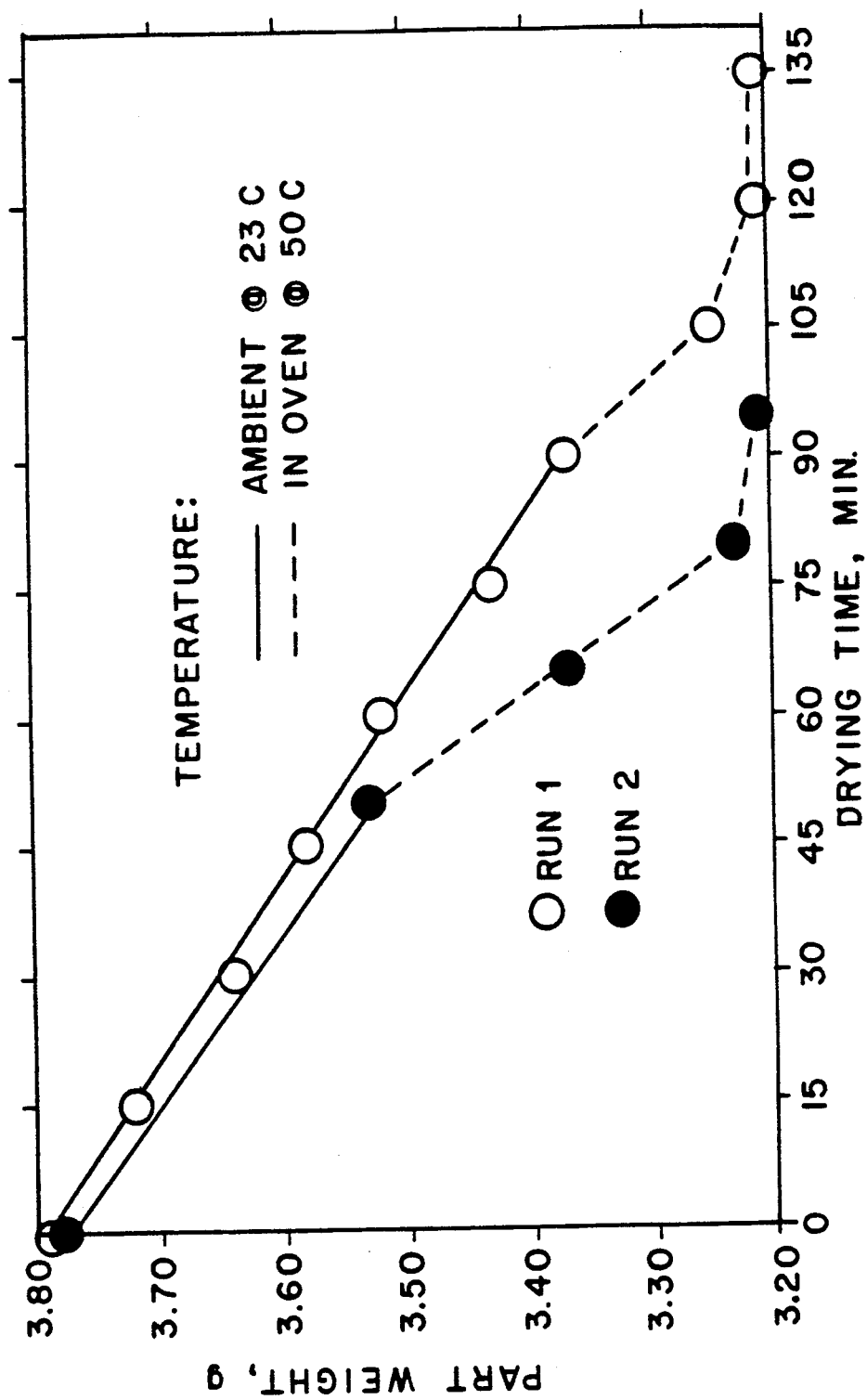
FIG. 3 is a graph illustrating the drying schedule for a molded ceramic part produced in accordance with the invention.
Figure 4:
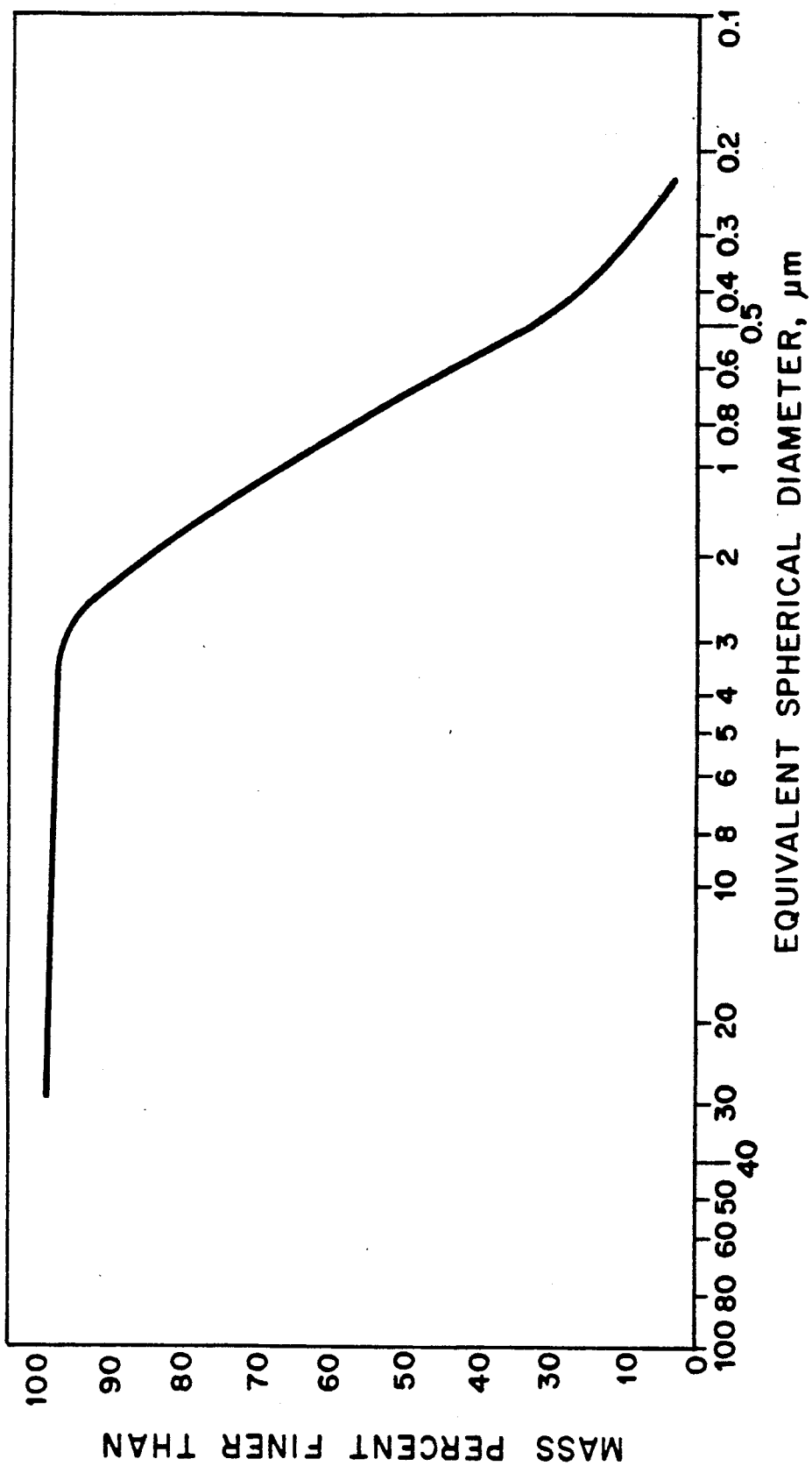
FIG. 4 is a trace of a particle size distribution determined on a sedigraph 5000 ET analyzer, which trace was obtained on a deagglomerated zirconia powder mixture used for injection molding oxygen sensor thimbles of the invention.

After the part is molded and cooled to a temperature below the gel point of the gel forming material, the green body is removed from the mold. The green body is typically sufficiently self supporting that it requires no special handling during removal from the mold or during placement into the furnace. The green body is then placed directly into the furnace after being removed from the mold and dried. As illustrated by the drying curve shown in FIG. 3, the evaporative loss of water occurs in a short period of time.

In the furnace, the body is sintered at an elevated temperature to produce the final product. The sintering times and temperatures (firing schedules) are regulated according to the powdered material employed to form the part. Preferably, the elevated temperature at which the body is sintered is at least 1300° C., and more preferably ranges from 1400 to 1600° C., and most preferably ranges from 1450 to 1550° C. Preferably, the sintering time at maximum temperature is less than 4 hrs., more preferably from 1 to 3 hrs. and most preferably from 1 to 2 hrs. Because of the use of the novel molding composition of the present invention, no supporting materials are required during firing.

Having described the invention in full, clear and concise terminology, the following examples are provided to illustrate some embodiments of the invention. The examples, however, are not intended to limit the scope of the invention to anything less than is set forth in the appended claims.

EXAMPLE 1

2435.9 g $ZrO_2$ (Daiichi DK-2), 253.7 g $Y_2O_3$ (Megon), and 160.5 g. $Al_2O_3$ (Alcoa A-16SG) were ball milled in 83.7 g deionized water containing 34.2 g Darvan C and 6.27 g TMA (tetramethylammonium hydroxide 25% solution, Alfa) for 24 hours. The ball-milled slip was then combined with 42.6 g agar (Meer Corp. S-100) in a heated Sigma blender. After the mix was cooled to room temperature, it was shredded in a food processor (Hobart, model KFP700) in order to prepare feed stock for the injection molding press. The mix was air dried to 83.44 wt % solids.

Oxygen sensor thimbles having a tubular configuration were molded using a Boy Mfg. Co. Model 15S Press. After being removed from the die, the parts were dried at room temperature and fired at 1550° C. for 0.5 h. The dimensions of the thimble are 1.2" in length and 0.21" and 0.40", measured at the stem and base, respectively. Physical properties were determined on 7 random parts. The buoyancy density was 5.7 g/cm³. Dimensional shrinkages amounted to 21.5% measured on the outer diameter and the length.

EXAMPLE 2

A composition was prepared for ball milling 24 h, containing 1676 g $ZrO_2$, 212 g $Y_2O_3$, 112 g $Al_2O_3$, 30 cm$^3$ Darvan C solution (Vanderbilt Laboratories), 18 cm$^3$ TMA solution and 541 g deionized water. The ball milled slip was combined in a heated sigma blender with 973 g additional ceramic powder of the same composition, 14.6 cm$^3$ Darvan C , 8.76 cm$^3$ TMA and 47.76 g agar. The mix was removed from the blender and shredded using a Kut-Kleen Kutter shredder. The solids concentration of the mix was 84.0 wt %. Oxygen sensor thimbles were molded in the Boy 15S Press. The parts were dried in ambient air and fired at 1500 C/1 h. The firing shrinkage was 19.6% and density (buoyancy method) of the fired parts was 5.55±05 g/cm$^3$.

Having thus described the invention in rather full detail it will be understood that such detail need not be strictly adhered to but that various changes and modifications may suggest themselves to one skilled in the art, all falling within the scope of the invention as defined by the subjoined claims.

We claim:

1. A method of forming the ceramic element in a zirconia oxygen sensor, comprising the steps of:
   a) forming a mixture comprising
      1) $ZrO_2$ and a stabilizer selected from the element group consisting of oxides of Y, Ce, Mg, Ca and mixtures thereof and having an average particle size less than or equal to 1 micron;
      2) an agaroid gel-forming material having a gel strength, measured at a temperature between 0° C. and about 22° C. on a gel consisting essentially of about 4 wt % of the gel-forming material and water, of at least about 100 g/cm$^2$;
      3) a gel-forming material solvent; and
   b) molding the mixture at a temperature sufficient to produce said ceramic element; and
   c) sintering the ceramic element at an elevated temperature to a density of at least 5.5 g/cm$^3$.

2. The method of claim 1 wherein the gel forming material comprises an agaroid and the stabilizer is $Y_2O_3$.

3. The method of claim 1 wherein the powders comprise between about 50% to about 90% (by weight) of the mixture, and have an average particle size ranging from 0.4 to 0.9 μm.

4. The method of claim 1 wherein the gel forming material comprises between about 0.2% and about 6% by weight of the mixture.

5. The method of claim 1 further comprising the step maintaining the mixture at a temperature above the gel point of the gel-forming material prior to the molding step (b).

6. The method of claim 5 wherein the temperature of the mixture during the molding step is reduced to a temperature below the gel point of the gel-forming material.

7. The method of claim 4 wherein the mixture further comprises a glycol.

8. The method of claim 7 wherein the glycol is present in an amount up to about 10% by weight of the gel-forming material and the gel forming solvent in the mixture.

9. The method of claim 2 wherein the agaroid is agar, agarose, or a mixture thereof.

10. The method of claim 4 wherein the agaroid is agar, agarose, or a mixture thereof.

11. An injection molding process comprising the steps of:
    a) forming a mixture comprising
       1) $ZrO_2$ and a stabilizer selected from the group consisting of oxides of Y, Ce, Mg, Ca and mixtures thereof, and having an average particle size less than or equal to 1 micrometer;
       2) an agaroid gel-forming material having a gel strength, measured at a temperature between 0° C. and about 22° C. on a gel consisting essentially of about 4 wt % of the gel forming material and water, of at least about 100 g/cm$^2$;
       3) a gel-forming material solvent, and
       4) a carrier;
    b) injecting the mixture into a mold, the mixture being maintained prior to the injection step at a first temperature above the gel point of the gel forming agent;
    c) cooling the mixture in the mold to a second temperature below the gel point of the gel-forming agent comprising the powders and a gel comprising the gel forming material; and
    d) sintering the ceramic element at an elevated temperature to a density of at least 5.5 g/cm$^3$.

12. The process of claim 11 wherein the powders are present in the mixture in an amount between about 50% and about 90% by weight of the mixture and have an average particle size ranging from 0.5 to 0.8 micrometers, the gel forming material is present in the mixture in an amount between about 0.2% and about 6% by weight of the mixture, and the solvent is present in an amount sufficient to dissolve the gel-forming material at the first temperature and to function as the carrier.

13. The process of claim 11 wherein the gel-forming material comprises an agaroid.

14. The process of claim 11 wherein the mixture further comprises a glycol.

15. The process of claim 14 wherein the glycol is present in an amount up to about 10% by weight of the gel forming material and the solvent in the mixture.

16. The method of claim 13 wherein the agaroid is agar, agarose, or a mixture thereof.

17. The method of claim 11 wherein the agaroid is agar, agarose, or a mixture thereof.

18. A process as recited by claim 11, wherein said stabilizer is a compound capable of yielding an oxide of at least one of said element group when subjected to high temperature processing.

19. A process as recited by claim 18, wherein said high temperature processing comprises calcination.

20. A process as recited by claim 11, wherein said mixture, upon being cooled to said second temperature, forms a self supporting article.

21. A composition of matter comprising $ZrO_2$, $Y_2O_3$ and $Al_2O_3$ and mixtures thereof, and having an average particle size less than or equal to 1 micrometer and, mixed therewith, an agaroid gel-forming material having a gel strength, measured at a temperature between 0° C. and about 22° C. on a gel consisting essentially of about 4 wt % of the gel forming material and water, of at least about 100 g/cm$^2$.

22. The composition of claim 18 wherein the gel-forming material comprises an agaroid.

* * * * *